Oct. 8, 1957 W. E. GILBERT 2,809,288

TUNING INDICATOR FOR WAVE SIGNAL RECEIVER USING BEAT FREQUENCY OSCILLATION INJECTION INTO SECOND DETECTOR

Filed April 23, 1954

INVENTOR.
William E. Gilbert
BY
Mason, Kolehmainen, Rathburn & Wyss
ATTYS.

2,809,288

TUNING INDICATOR FOR WAVE SIGNAL RECEIVER USING BEAT FREQUENCY OSCILLATION INJECTION INTO SECOND DETECTOR

William Edwin Gilbert, Buffalo, N. Y.

Application April 23, 1954, Serial No. 425,189
11 Claims. (Cl. 250—20)

The present invention relates to a tuning indicator arrangement for a wave signal receiver, and particularly to means for insuring accurate tuning of such receivers. The arrangement is especially well adapted for "setting up" the tuning of individual push-buttons of a push-button type receiver, whereby assurance may be had of tuning to the exact center frequency of the particular intermediate frequency for which a receiver is aligned.

Various means have heretofore been suggested as an aid to insure accurate tuning of a wave signal receiver to a predetermined carrier. It is, of course, a well-known fact that the strength of a signal from a particular transmitter as received by a wave signal receiver may vary widely at different times. When the signal strength is high it is not important that the set be accurately tuned and slight mistunes are not detected. However, when the received signal is weaker, such mistune may be very serious and may result in the background noise being so great relative to the received signal as to make satisfactory performance impossible.

Many wave signal receivers are provided with push-buttons for tuning in selected stations merely by depressing or actuating a particular push-button. These push-buttons must be initially "set up" for particular selected stations, and it is essential that in setting up the push-button it be properly adjusted so that upon subsequent actuations thereof the set is exactly tuned to the right frequency. Present day requirements for amplitude modulation super-heterodyne receivers call for a sufficiently wide intermediate frequency band width for high fidelity reception that makes it possible in tuning a set by ear in the conventional manner to a strong signal that such tuning can be as much as a kilocycle or more off from the exact center frequency of the intermediate frequency for which the set is aligned. In the case of a push-button type receiver, if a mistune of a kilocycle or so is accomplished, it will be mistuned the same amount every time the push-button is actuated, and, obviously, at times when the received signal is weak, very poor performance will result. It would be desirable, therefore, to provide a tuning indicator unit which will aid generally in tuning a wave signal receiver and which is particularly desirable for use with a push-button type receiver, so that in "setting up" the push-buttons assurance is had that the push-buttons will tune the set to the exact center frequency of the intermediate frequency for which the set is aligned. It would, moreover, be desirable to provide such an arrangement without the requirement of an additional tube such as the so-called "tuning eye" or electron-ray tube heretofore employed for this purpose.

Tuning indication with such tuning eyes or electron-ray tubes has been employed extensively heretofore. Electron-ray tubes indicate visually, by means of a fluorescent target, the effects of a change in controlling voltage, and this principle can be used to produce a tuning indicator for a radio receiver. However, it requires an additional tube in the receiver and, hence, substantially adds to the cost of the receiver. Also, in certain applications such as the automobile radio, the situation is complicated by the use of such an electron-ray tube, since the dashboard may not accommodate a visual indicator. It would be desirable, therefore, to provide tuning indication means particularly adapted for push-button receivers and which is particularly adapted for use with automobile radios as well as home receivers.

There are on the market today numerous push-button type tuning units for wave signal receivers. A very common type of push-button tuning unit comprises one in which the push-buttons are associated with mechanical means for adjusting the tuning shaft to predetermined selected positions as is selectively determined by the particular "set-up" of the push-buttons. A common procedure is for the push-button to be pulled out or moved in a predetermined manner to release a cam or other similar apparatus, after which the set is tuned to a particular station, and then the push-button is moved to its normal tuning position, which results in setting up the push-button so that thereafter it will always select the same frequency. It would be desirable to provide a tuning indicator unit which is rendered effective whenever any push-button of the set is moved in a manner to set the same up initially, as, for example, a movement different from that when the push-button is actuated to tune in a station. One such movement could be one exactly opposite from that when actuating the push-button to tune it to the transmitting station for which it is "set up."

Accordingly, it is an object of the present invention to provide a new and improved tuning indicator unit for a wave signal receiver.

It is another object of the present invention to provide tuning indication means for a wave signal receiver which utilizes an electron tube already present in the receiver for another function.

It is a further object of the present invention to provide a tuning indicator unit for a wave signal receiver which is especially adapated for use with push-button receivers so that during the adjusting or "setting up" operation of any one of the push-buttons the tuning indicator unit will be rendered effective to insure accurate tuning.

Still another object of the present invention resides in the provision of an improved tuning indicator unit comprising a beat frequency oscillator utilizing one of the electron discharge valves normally used for some other function when the set is operating to receive a selected signal, but which is momentarily rendered effective during the setting up of the push-button tuning to insure accurate setting of the push-button to a selected frequency or station.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawing in which.

Figures 1, 2, 3:
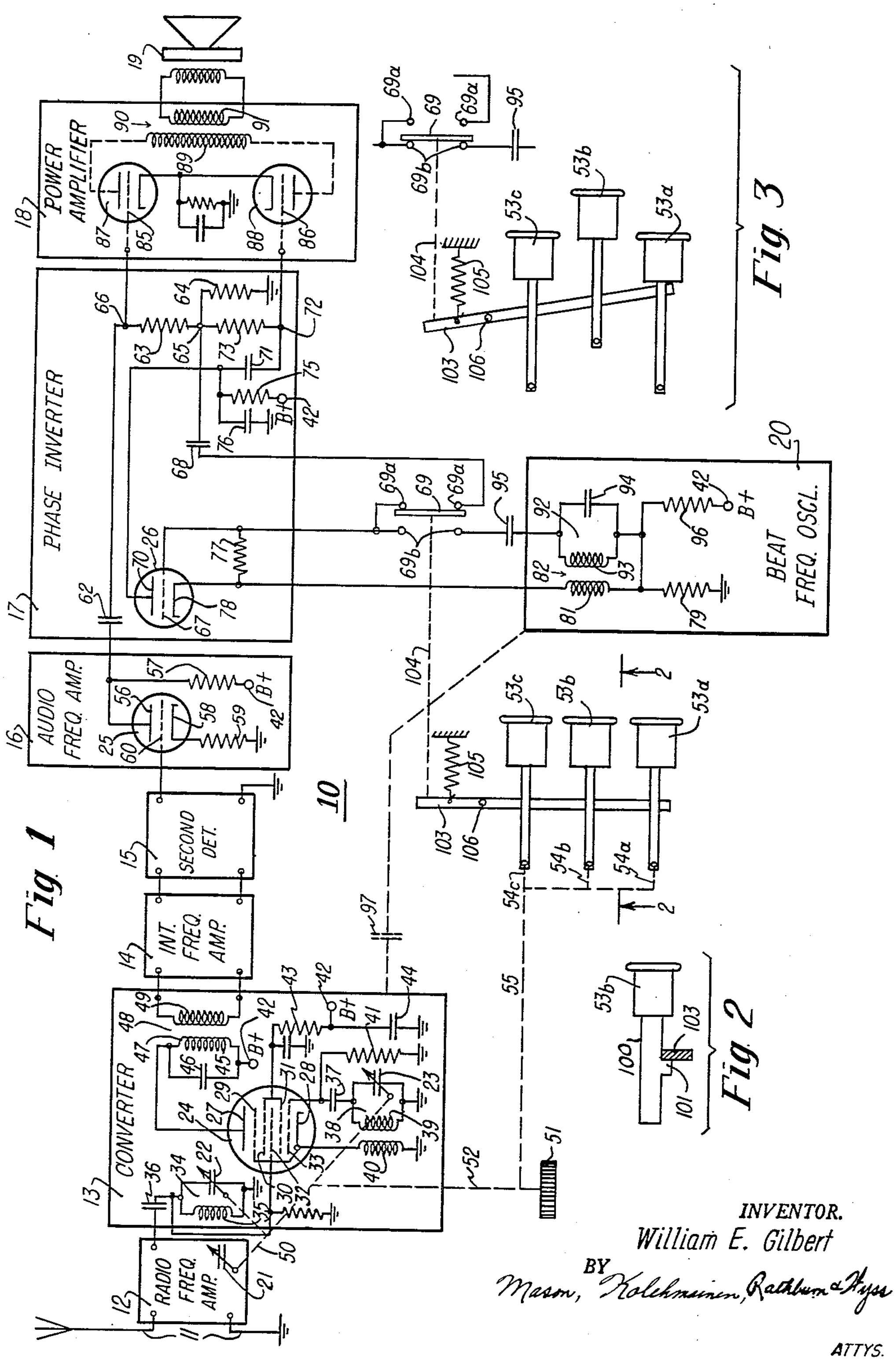
Fig. 1 is a schematic representation of a wave signal receiver embodying the present invention.
Fig. 2 is a somewhat diagrammatic view taken on line 2—2 of Fig. 1.
Fig. 3 is a fragmentary view of a portion of Fig. 1 illustrating a different operating condition of the wave signal receiver of Fig. 1.

Although the present invention has application to wave signal receivers generally, it is particularly well adapted for application to a wave signal receiver of the type employing push-button tuning, and for the purpose of illustrating the present invention it is so disclosed in the drawing. Referring now to Fig. 1 of the drawing, there is illustrated a wave signal receiver generally designated at 10, which is illustrated as a super-heterodyne type receiver, substantial portions of which are merely represented by block diagrams, since the construction and function thereof are so well-known to all those skilled in the art. Associated with the wave signal receiver 10 and described in detail hereinafter is the tuning indicator unit of the present invention.

As illustrated, the wave signal receiver 10 comprises an antenna ground circuit 11 for receiving the signals transmitted from transmitting stations within the reception range of the receiver 10. It will, of course, be understood that the antenna 11 will be a satisfactory antenna for the particular receiver involved. Actually, receiver 10 is illustrated as a conventional amplitude modulation wave signal receiver of the super-heterodyne type, but, of course, it might comprise a frequency modulation wave signal receiver, and, in such case, the appropriate antenna ground circuit 11 would be provided in dependence upon the type of receiver involved. The wave signal receiver 10 further includes a radio frequency selector and amplifier unit 12, and a converter unit 13 which might equally well comprise a separate mixer and oscillator section for the purpose of converting the radio frequency signal to an intermediate frequency signal. The receiver 10 is illustrated as also including an intermediate frequency amplifier unit 14, a second detector unit 15, an audio frequency amplifier unit 16, a phase inverter unit 17, a power amplifier unit 18, and a signal reproducer unit 19. All of these units or stages are connected in cascade in the order named. In addition, the present invention is concerned with an additional unit designated by the reference numeral 20, which, in conjunction with the wave signal receiver 10, provides a tuning indicator unit in a manner described in detail hereinafter.

Before considering the tuning indicator unit 20 of the present invention and its relationship to the wave signal receiver 10, a brief consideration will be given to the receiver 10, the operation of which will be well understood by those skilled in the art. Briefly, however, for the amplitude modulation receiver illustrated, the radio frequency signal will be intercepted by the antenna ground circuit 11 and supplied to the radio frequency selector and amplifier unit 12, wherein the carrier signal is selected and amplified. Such a radio frequency amplifier contains the conventional resonant frequency varying means which is schematically illustrated in the drawing by the reference numeral 21. The resonant frequency varying means 21 of the radio frequency selector and amplifier unit 12 is arranged for conventional gang operation with additional resonant frequency varying means such as the condenser 22 and the condenser 23 associated with the converter unit 13. The amplified and selected radio frequency signals from the unit 12 are supplied to the converter or oscillator modulator unit 13, which may comprise the well-known pentagrid converter designated by the reference numeral 24 for converting the radio frequency signal to an intermediate frequency signal. As was mentioned above, however, the converter or oscillator modulator unit 13 may comprise two separate stages: (1) a local oscillator stage for producing oscillations which are combined with the radio frequency signals, and (2) a modulator stage to combine the local oscillator output with the radio frequency output to produce a beat frequency which is generally referred to as an intermediate frequency. Conventionally, this intermediate frequency for an amplitude modulation receiver may have values such, for example, as 265 kilocycles, 455 kilocycles or the like. This designated intermediate frequency is, of course, the center frequency for the intermediate frequency signal band width.

The output of the converter unit 13 is supplied to an intermediate frequency amplifier unit 14, and from there this intermediate frequency signal is supplied to a second detector stage 15, where it is converted to an audio frequency signal in the conventional manner. The audio frequency signal from the second detector 15 is then supplied to an audio frequency amplifier 16, which has been illustrated as a triode 25. Since a push-pull type of output is illustrated in the drawing in connection with the power amplifier 18, a phase inverter 17 is included, and resistance coupling between the audio frequency amplifier stage 16, the phase inverter stage 17 and the power amplifier 18 is employed, as will be described in greater detail hereinafter. The amplified audio frequency signal from the power amplifier 18 is supplied to the signal reproducer 19, which has been illustrated as a loud speaker, although, obviously, it might comprise other signal reproduction means as in the case where the wave signal receiver 10 is a television receiver.

In accordance with the present invention, an electron discharge valve of one of the units or stages is temporarily employed as a beat frequency oscillator for producing a frequency equal to the center frequency of the intermediate frequency for which the receiver is aligned. Thus, the unit 20 may be considered as a beat frequency oscillator, although the electron discharge valve included in the beat frequency oscillator unit 20 is disposed in another stage of the wave signal receiver 10. As illustrated, the electron discharge valve 26 of the phase inverter stage 17 is temporarily employed as the electron discharge valve for the beat frequency oscillator 20 during a tuning operation. Obviously, some other electron discharge valve might be employed, such, for example, as one of the electron discharge valves of the power amplifier 18. From the ensuing description it will be apparent that the receiver 10 must be capable of functioning to produce an output in the signal reproducer 19 while the beat frequency oscillator 20 is functioning, which means that an electron discharge valve from a stage used in the beat frequency oscillator 20 must be one which, when functioning as such beat frequency oscillator, will not incapacitate the operation of the receiver insofar as supplying an output to the reproducer 19 is concerned. It will be understood that the electron discharge valve for the beat frequency oscillator 20 might comprise an additional tube in the wave signal receiver 10, although this is not desirable, since with the present invention it is not necessary. It might, of course, also comprise one section of a multisection tube such as one section of a twin triode or the like.

Before considering the beat frequency oscillator 20 of the present invention, the converter 13, the audio frequency amplifier 16 and the phase inverter 17 will be described in somewhat greater detail so that the relationship of the beat frequency oscillator 20 to the wave signal receiver 10 can better be understood by those skilled in the art. As illustrated, the converter 13 comprises the conventional pentagrid converter 24 having a plate 27, a cathode 28, a suppressor grid 29, a pair of screen grids 30 and 31, a radio frequency input control electrode 32 and an oscillator grid 33. In the conventional manner the radio frequency input control electrode 32 is coupled through a suitable tuned circuit or tank circuit 34, including the capacitor 22 and an inductance 35, with the output of the radio frequency selector and amplifier 12 through a suitable coupling capacitor 36. The oscillator grid 33, on the other hand, is connected through a suitable coupling capacitor 37 with a tank circuit 38, including the capacitor 23 and an inductance 39 inductively coupled with a winding 40 connected to the cathode 28. Corresponding terminals of the windings 39 and 40 are grounded as indicated. A suitable by-pass resistor 41 is connected between the oscillator grid 33 and ground. The screen grids 30 and 31 are connected to a suitable source of +B potential 42 through a voltage dropping resistor 43. A conventional by-pass condenser 44 is also provided as indicated. In the conventional manner, the plate 27 of the pentagrid converter 24 is connected to a source of +B potential 42 through a tuned circuit 45, including the capacitor 46 and the inductance 47, forming one winding of an intermediate frequency transformer 48 having a secondary winding 49 coupled to the intermediate frequency amplifier 14.

In order to tune the wave signal receiver 10, the resonant frequency varying means illustrated specifically as capacitors 21, 22 and 23 are gang connected, as indicated by dashed lines 50, which might comprise a common tuning shaft interrelating these elements. A suitable manual control knob 51 is connected by means schematically indicated at 52 for manually tuning the wave signal receiver 10. It will be understood that permeability tuning rather than capacitor tuning might equally well be employed.

For the purpose of tuning the receiver 10 in a simple manner, a plurality of conventional push-buttons, schematically indicated as 53*a*, 53*b*, 53*c*, etc., are provided. These push-buttons, collectively designated as 53, are indicated as being schematically connected by means 54*a*, 54*b*, 54*c* and 55 with the tuning shaft 52. The particular construction of the push-buttons 53 and the means 54*a*, 54*b*, 54*c* and 55 interconnecting them with the tuning shaft form no part of the present invention. They could, for example, comprise an arrangement similar to that disclosed in Pifer et al. Patent No. 2,530,663, granted November 21, 1950, and assigned to the same assignee as the present application, or they might comprise a construction like that shown in Plensler Patent No. 2,266,710. These push-buttons 53 and the means 54*a*, 54*b*, 54*c*, etc., collectively designated as 54, as well as the means 55 might, for example, be the type of push-buttons wherein to selectively tune any station the push-button is depressed or moved to the left, as viewed in Figs. 1 and 2 of the drawing. During the "setting up" operation of the push-buttons to select a particular channel for a particular push-button which will thereafter be tuned in upon actuation thereof, the push-buttons may be the type that are pulled out or in a direction opposite to that in which they normally move during a station selecting operation, as, for example, to the position of push-button 53*b* shown in Fig. 3 of the drawing. The particular movement of the push-button when actuated to select the station and when moved to initially set up the push-button is not important as far as the present invention is concerned, although it will become apparent from the ensuing description that such motion is utilized to perform a control function with respect to the beat frequency oscillator 20.

Considering now the audio frequency amplifier 16, comprising the triode 25, it may be noted that the plate 56 thereof is connected to a source of +B potential 42 through a suitable current limiting resistor 57, the cathode 58 is indicated as being grounded through a suitable cathode resistor 59, while the control electrode 60 is coupled to the output of the second detector 15. It will be appreciated that automatic gain control circuits will normally be included, but they have been completely eliminated from the disclosure of the wave signal receiver 10 for the purpose of simplifying the same. These can be employed in the conventional manner, as will readily be understood by those skilled in the art.

For the purpose of supplying a push-pull type of power amplifier 18, the output of the audio frequency amplifier 16 is coupled by means of a capacitor 62 to an audio frequency voltage divider comprising the resistors 63 and 64 connected in series and to ground, as indicated in Fig. 1 of the drawing. The common terminal of the resistors 63 and 64 is designated by the reference numeral 65. The other terminal of the resistor 64 is grounded, while the other terminal of resistor 63 is designated by the reference numeral 66.

To provide a self-balancing type of phase inverter, the voltage drop across the resistor 64 is supplied to the control electrode 67 of the electron discharge valve 26 through a suitable coupling capacitor 68 and the contacts 69*a* of a switch 69 described in greater detail hereinafter. The plate 70 of the electron discharge valve 26 is connected through the coupling capacitor 71 to the terminal 72 of a grid leak resistor 73 whose other terminal is connected to the terminal 65. The plate 70 is, of course, also provided with a suitable source of plate voltage from the +B source 42 through a plate load resistor 75. A suitable by-pass capacitor 76 is also associated with the plate circuit of the electron discharge valve 26. A suitable grid leak resistor 77 is connected between the grid 67 of the electron discharge valve 26 and the cathode 78. This cathode is connected to ground through a cathode bias resistor 79 and the winding 81 of an oscillator transformer 82 described in greater detail hereinafter. The operation of the self-balancing type of phase inverter described will readily be understood. The amplified plate voltage from the audio frequency amplifier unit 16 appears across the audio frequency voltage divider comprising the resistors 63 and 64 in series. The drop across resistor 64 is applied to the control electrode 67 of the electron discharge valve 26, and the amplified output voltage from the electron discharge valve 26 appears across resistors 73 and 64 in series. This voltage is 180° out of phase with the voltage from the electron discharge valve 25, thus giving the push-pull output. The part of the voltage appearing across resistor 64 from the output of the electron discharge valve 26 opposes the voltage from electron discharge valve 25 appearing across this same resistor 64, thus reducing the signal applied to the control electrode 67 of electron discharge valve 26. The negative feedback so obtained tends to regulate the voltage applied to the phase inverter tube 26, so that the output voltages from both tubes are substantially equal. The gain is slightly less than twice the gain of a single-tube amplifier using the same operating conditions.

From the above description it will be apparent that the terminals 66 and 72 of resistors 63 and 73, respectively, are connected to the control electrodes 85 and 86, respectively, of power amplifier tubes 87 and 88, respectively. These power amplifier tubes which might be beam power tubes have their cathodes interconnected and their plate circuits connected through the primary winding 89 of an output transformer 90 having its secondary winding 91 connected to the signal reproducer 19 in the conventional manner. As long as the contacts 69*a* of the switch 69 are closed, the phase inverter 17 operates in a conventional manner with the wave signal receiver 10 having the conventional push-pull output.

It will be appreciated that if the contacts 69*a* of the switch 69 were opened the phase inverter 17 would not operate, but the audio frequency output from amplifier 16 supplied to the audio frequency voltage divider comprising resistors 63 and 64 in series would still supply an output signal to the signal reproducer 19 to produce what might commonly be termed "single-ended" operation of the push-pull circuit. This output, however, is sufficient to permit the audio signal to be heard, particularly for tuning purposes, in the manner described hereinafter.

In accordance with the present invention, the beat frequency oscillator 20 includes a tank circuit 92 comprising the inductance 93 forming one winding of the oscillator transformer 82 and a capacitor 94. The tank circuit 92 is connected by a coupling capacitor 95 and the contacts 69*b* of the switch 69 with the control electrode 67 of the electron discharge valve 26. A supply of +B potential from the source 42 is connected through a suitable bleeder resistance 96 with one terminal of the tank circuit. The tank circuit is also connected to one terminal of the resistor 79, so that the drop across resistor 96 is supplied through the tank circuit 92 to the control electrode 67 of electron discharge valve 26 when the contacts 69*b* of the switch 69 are closed. It will be apparent, therefore, that under these conditions the electron discharge valve 26 will function as an oscillator with the output frequency thereof determined by the constants of the tank circuit 92. In accordance with the present invention, the tank circuit 92 is so designed that the beat frequency oscillator 20 will have an output frequency exactly equal to that of the center frequency of the intermediate frequency for which the wave signal receiver 10 is aligned. If, for example, the center frequency of the intermediate frequency for which the receiver 10 is aligned is 265 kilocycles, then the beat frequency oscillator 20 would put out an output frequency of 265 kilocycles whenever the contacts 69*b* of the switch 69 were closed.

To obtain a tuning indication, the output of the beat frequency oscillator 20 is suitably coupled to the converter stage 13, and this is schematically indicated by a capacitor designated at 97. The capacitor 97 may represent merely stray coupling by virtue of the relative positions occupied by the converter stage 13 and the beat frequency oscillator stage 20 in the receiver 10, or actual electrical coupling of some sort might be provided between the stages so that the output of the beat frequency oscillator is supplied to the converter tube 24 and passes through the various stages to beat with the intermediate frequency. Thus, while tuning the set or while tuning the wave signal receiver 10, the beat frequency oscillator 20 is rendered effective by closing the switch contacts 69*b* of the switch 69, and when the beat frequency is tuned so that actually a zero beat frequency is obtained, exact tuning is assured.

In accordance with the present invention, the beat frequency oscillator 20 is rendered effective whenever any one of the push-buttons 53 is moved in a manner to reset the same or to initially set up the same. Assuming that the push-buttons 53 are the type which are moved a small distance to the right along the longitudinal axis thereof, as viewed in Fig. 1 of the drawing, the shank portion 100 of each push-button is provided with a depending finger 101, as is clearly shown in Fig. 2 of the drawing, engageable with a bar 103 pivoted at 106. This bar is connected by suitable means 104 with the switch blade of switch 69. Actually, a spring switch blade would probably be provided, although the switch is only schematically shown in the drawing. A biasing spring 105 normally biases the bar or arm 103 pivoted at 106 to a position whereby the switch blade of switch 69 bridges contact 69*a*. When any one of the push-buttons 53 is moved to the right, as viewed in Figs. 1 and 2 of the drawing, as, for example, 53*b*, which would be a movement occasioned during resetting or initially setting up the push-buttons, the bar 103 would pivot about pivot point 106 in a direction to open the contacts 69*a* and close the contacts 69*b*, thus rendering the beat frequency oscillator effective. The tuning knob 51 could then be actuated to tune in the desired signal to the exact center frequency of the intermediate frequency signal, which also equals the frequency of the beat frequency oscillator 20, whereupon the particular push-button being set up could be depressed or actuated to lock it in the conventional manner and restore the switch 69 to its normal position.

With the above described arrangement it will be apparent that the beat frequency oscillator 20 is rendered effective only when one or more of the push-buttons are moved in a direction more or less different or opposite from that when the push-button is actuated to select a station, and as soon as the station is accurately selected and the push-buttons depressed, the beat frequency oscillator 20 is rendered ineffective and the wave signal receiver 10 operates in the normal manner. There has, moreover, been provided a tuning indicator unit which does not require the addition of another tube but uses one normally employed in the wave signal receiver for other purposes. Specifically, in the illustrated application the phase inverter tube 26 is employed, although other tubes might equally well be used for this purpose. The additional equipment requires only the switch 69, the tank circuit 92, plus the necessary circuit connections, and, of course, the mechanical connections for relating the switch 69 to the push-buttons 53.

It will be understood that various circuit arrangements and various circuit components may be employed in connection with the arrangement of the present invention. However, in order to illustrate the relative magnitudes of the principal elements of a typical circuit arrangement which has been found to satisfactorily embody the present invention, the following approximate values of such elements, together with other pertinent information, are given for a particular device. It should be understood that these values are given by way of example only and not by way of limitation.

| | |
|---|---|
| Electron discharge valve **24** | 6BE6. |
| Electron discharge valve **25** | Section of 6AV6. |
| Electron discharge valve **26** | Section of 6AV6. |
| Electron discharge valve **87** | 6V6GT. |
| Electron discharge valve **88** | 6V6GT. |
| Resistor **63** | 150,000 ohms. |
| Resistor **64** | 47,000 ohms. |
| Resistor **73** | 220,000 ohms. |
| Resistor **75** | 330,000 ohms. |
| Resistor **77** | 2,700 ohms. |
| Resistor **79** | 2,700 ohms. |
| Resistor **96** | 68,000 ohms. |
| Capacitor **62** | .022 mf. |
| Capacitor **68** | .01 mf. |
| Capacitor **71** | .022 mf. |
| Capacitor **94** | 130 mmf. |
| Capacitor **95** | 18 mmf. |

In view of the detailed description included above, the operation of the present invention will readily be understood by those skilled in the art. It will, moreover, be apparent that by means of an electron discharge valve, already a part of the receiver for another purpose, a tuning indicator unit can be provided by merely providing the elements for an oscillator when combined with such tube or valve. Moreover, the entire device can be controlled by simply actuating the push-buttons to render the tuning means effective or ineffective. Although the beat frequency oscillator has been indicated as being rendered effective by the push-buttons, it will be apparent that, if desired, it could also be rendered effective when the manual knob 51 is used.

While there has been described and illustrated what is at present considered a preferred embodiment of the invention, it will be obvious to those skilled in the art that various changes and modifications may be made therein without departing from the present invention, and it is aimed in the appended claims to cover all such changes and modifications as fall within the true spirit and scope of the present invention.

What is claimed as new and desired to be secured by Letters Patent of the United States is:

1. In a tuning indicator unit for a wave signal receiver of the super-heterodyne type comprising a plurality of stages for converting a radio frequency signal to an intermediate frequency signal and subsequently to an audio frequency signal comprising, a section of said receiver for converting a radio frequency signal to an intermediate frequency signal, a beat frequency oscillator in said receiver including an electron discharge valve which also functions as the electron discharge valve in one of the stages of said receiver, switch means for selectively rendering said valve effective to function either in said one of said stages or in said beat frequency oscillator, said beat frequency oscillator producing an output frequency when rendered effective equal to the center frequency of the intermediate frequency signal for which said receiver is aligned, said section and said beat frequency oscillator being coupled to permit the oscillations from said beat frequency oscillator to pass through said section, push-button tuning means for said receiver including a plurality of push-buttons, and means responsive to a predetermined movement of one of said push-buttons in a direction different from that required for tuning said receiver by said one push-button for actuating said switch means to render said valve effective in said beat frequency oscillator and ineffective in said one of said stages.

2. In a tuning indicator unit for a wave signal receiver of the super-heterodyne type comprising a plurality of stages for converting a radio frequency signal to an intermediate frequency signal and subsequently to an audio frequency signal comprising, a converter stage for converting a radio frequency signal received by said receiver to an intermediate frequency signal, a beat frequency oscillator in said receiver including an electron discharge valve which also functions as the electron discharge valve in one of the stages of said receiver, and switch means for selectively rendering said valve effective to function either in said one of said stages or in said beat frequency oscillator, said beat frequency oscillator producing an output frequency when rendered effective equal to the center frequency of the intermediate frequency signal for which said receiver is aligned, said section and said beat frequency oscillator being coupled so the oscillations from said beat frequency oscillator beat with said intermediate frequency signal.

3. A tuning indicator for a wave signal receiver of the super-heterodyne type comprising a plurality of stages for converting a radio frequency signal to an intermediate frequency signal and subsequently to an audio frequency signal comprising, a converter for converting a radio frequency signal received by said receiver to an intermediate frequency signal, a demodulator for detecting a modulating wave of said intermediate frequency signal, a power amplifier section in said receiver having first and second discharge devices connected in push-pull relationship, an inverter section for coupling a portion of the detected signal to one of said devices, means for coupling another portion of the detected signal to the other of said devices, a beat frequency oscillator in said receiver including an electron discharge valve in said inverter section, switch means for selectively rendering said valve effective to function either in said inverter section or in said beat frequency oscillator, said beat frequency oscillator producing an output frequency when rendered effective equal to the center frequency of the intermediate frequency signal for which said receiver is aligned, and means for superimposing the output of said beat frequency oscillator on said intermediate signal.

4. A tuning indicator for a wave signal receiver of the super-heterodyne type comprising a plurality of stages for converting a radio frequency signal to an intermediate frequency signal and subsequently to an audio frequency signal comprising, a section of said receiver for converting a radio frequency signal to an intermediate frequency signal, an inverter stage in said receiver, a beat frequency oscillator in said receiver including an electron discharge valve which also functions as the electron discharge valve of said inverter stage, switch means for selectively rendering said valve effective to function either in said inverter stage or in said beat frequency oscillator, said beat frequency oscillator producing an output frequency when rendered effective equal to the center frequency of the intermediate frequency signal for which said receiver is aligned, said section and said beat frequency oscillator being coupled so that oscillations from said beat frequency oscillator pass through said section, push-button tuning means for said receiver including a plurality of push-buttons, and means responsive to a predetermined movement of one of said push-buttons in a direction different from that required for tuning said receiver by said one push-button for actuating said switch means to render said valve effective in said beat frequency oscillator and ineffective in said inverter stage.

5. In a tuning indicator unit for a wave signal receiver of the super-heterodyne type comprising a plurality of stages for converting a radio frequency signal to an intermediate frequency signal and subsequently to an audio frequency signal comprising, a section of said receiver for converting a radio frequency signal to an intermediate frequency signal, a beat frequency oscillator in said receiver including an electron discharge valve which also functions as the electron discharge valve in one of the stages of said receiver, switch means for selectively rendering said valve effective to function either in said one of said stages or function in said beat frequency oscillator, said beat frequency oscillator producing an output frequency when rendered effective equal to the center frequency of the intermediate frequency signal for which said receiver is aligned, said section and said beat frequency oscillator being coupled so that the oscillations from said beat frequency oscillator pass through said section, push-button tuning means for said receiver including a plurality of push-buttons, and means responsive to a predetermined movement of one of said push-buttons in a direction opposite from that required for tuning said receiver by said one push-button for actuating said switch means to render said valve effective in said beat frequency oscillator and ineffective in said one of said stages, said switch means rendering said beat frequency oscillator ineffective upon moving said push-button in a direction to tune in the transmitting station controlled by said one push-button.

6. In a tuning indicator unit for a wave signal receiver of the super-heterodyne type comprising a plurality of stages for converting a radio frequency signal to an intermediate frequency signal and subsequently to an audio frequency signal comprising, a converter stage for converting a radio frequency signal received by said receiver to an intermediate frequency signal, an inverter stage including an electron discharge valve, a beat frequency oscillator in said receiver including said electron discharge valve of said inverter stage, switch means for selectively rendering said valve effective to function either in said inverter or in said beat frequency oscillator, said beat frequency oscillator when rendered effective producing an output frequency equal to the center frequency of the intermediate frequency signal for which said receiver is aligned, said section and said beat frequency oscillator being coupled so the oscillations from said beat frequency oscillator beat with said intermediate frequency signal, and means operative during a tuning operation of said receiver for actuating said switch means.

7. A tuning indicator for a wave signal receiver of the super-heterodyne type comprising a plurality of stages for converting a radio frequency signal to an intermediate frequency signal and subsequently to an audio frequency signal comprising, a converter stage for converting a radio frequency signal received by said receiver to an intermediate frequency signal, an electron discharge valve in another of said stages, first circuit means normally effective for operating said electron discharge valve in said other of said stages, second circuit means for operating said electron discharge valve as an oscillator having an output frequency equal to the center frequency of the intermediate frequency signal for which said receiver is aligned, means for supplying the output of said beat frequency oscillator to said converter stage, tuning means for said receiver, and means responsive to predetermined operation of said tuning means for rendering said first circuit means ineffective and said second circuit means effective.

8. A tuning indicator for a wave signal receiver comprising a signal transmission channel in said receiver including an electron discharge device, first circuit means normally operative to cause said device to operate in said signal transmission channel, second circuit means for operating said device as an oscillator having an output signal frequency equal to the center frequency of the intermediate frequency signal for which said receiver is aligned, means for supplying the output signal of said oscillator to said channel, means for tuning said receiver including a push-button movable to a station selecting position to tune said receiver to receive the radiated carrier from a predetermined transmitter, and means responsive to movement of said push-button to a position different from said station selecting position to render said second circuit means effective whereby accurate tuning of said receiver can be accomplished.

9. A tuning indicator for a wave signal receiver comprising a signal transmission channel in said receiver including an electron discharge valve, first circuit means normally operative to cause said valve to operate in said signal transmission channel as an inverter, second circuit means for operating said valve as an oscillator having an output signal frequency equal to the center frequency of the intermediate frequency signal for which said receiver is aligned, means for supplying the output signal of said oscillator to said channel, means for tuning said receiver including a push-button movable to a station selecting position to tune said receiver to receiver the radiated carrier from a predetermined transmitter, and means responsive to movement of said push-button to a position different from said station selecting position to render said second circuit means effective, whereby a comparison of the frequency of the oscillator output signal with said intermediate frequency signal can be accomplished.

10. In a super-heterodyne wave signal receiver the combination of an electron discharge valve and first circuit means including said valve normally operative in a signal transmission channel of said receiver, second circuit means including said electron discharge valve operative as an oscillator having an output frequency equal to the center frequency of the intermediate frequency signal for which said receiver is aligned, means for supplying the output of said beat frequency oscillator to said signal transmission channel, tuning means for said receiver and means responsive to predetermined operation of said tuning means for rendering said first circuit means ineffective and said second circuit means effective, whereby a comparison of said oscillator output frequency with the frequency of the intermediate frequency signal of said receiver can be made.

11. A tuning indicator for a wave signal receiver comprising a signal transmission channel in said receiver including an electron discharge device, first circuit means normally operative to cause said device to operate in said signal transmission channel, second circuit means for operating said device as an oscillator having an output signal frequency bearing a predetermined relationship to the center frequency of the intermediate frequency signal for which said receiver is aligned, means for supplying the output signal of said oscillator to said channel, and means for selectively rendering said second circuit operative and said first circuit inoperative.

References Cited in the file of this patent

UNITED STATES PATENTS

| | | |
|---|---|---|
| 2,111,738 | Roberts | Mar. 22, 1938 |
| 2,265,394 | Ranly | Dec. 9, 1941 |

FOREIGN PATENTS

| | | |
|---|---|---|
| 467,754 | Great Britain | June 23, 1937 |
| 475,064 | Great Britain | Nov. 12, 1937 |